(12) United States Patent
Schneider et al.

(10) Patent No.: US 8,957,559 B2
(45) Date of Patent: Feb. 17, 2015

(54) HOUSING FOR AN ACTUATOR FOR RECEIVING AN ELECTRIC MOTOR AND AN ASSEMBLY

(71) Applicant: Minebea Co., Ltd., Nagano (JP)

(72) Inventors: Helmut Schneider, Zimmern-Flözlingen (DE); Jürgen Schill, Bad Dürrheim (DE)

(73) Assignee: Minebea Co., Ltd., Miyota-Machi, Kitasaku-Gun, Nagano (JP)

( * ) Notice: Subject to any disclaimer, the term of this patent is extended or adjusted under 35 U.S.C. 154(b) by 126 days.

(21) Appl. No.: 13/664,983

(22) Filed: Oct. 31, 2012

(65) Prior Publication Data

US 2013/0106219 A1 May 2, 2013

(30) Foreign Application Priority Data

Oct. 31, 2011 (DE) .......................... 10 2011 054 958

(51) Int. Cl.
| | |
|---|---|
| H02K 5/04 | (2006.01) |
| H02K 5/22 | (2006.01) |
| H02K 5/16 | (2006.01) |
| H02K 7/116 | (2006.01) |

(52) U.S. Cl.
CPC .. *H02K 5/22* (2013.01); *H02K 5/16* (2013.01); *H02K 5/04* (2013.01); *H02K 7/116* (2013.01)
USPC .................................. 310/89; 310/83; 310/43

(58) Field of Classification Search
USPC .......................................... 310/83, 89, 43, 71
See application file for complete search history.

(56) References Cited

U.S. PATENT DOCUMENTS

| 4,028,571 | A | | 6/1977 | Dicke |
| 4,602,176 | A | * | 7/1986 | Baker ............................. 310/51 |
| 5,334,897 | A | * | 8/1994 | Ineson et al. .................... 310/89 |
| 5,508,578 | A | * | 4/1996 | Suzuki et al. ................. 310/194 |
| 5,714,815 | A | | 2/1998 | Fritzinger et al. |
| 5,942,821 | A | | 8/1999 | Shin ............................ 310/67 R |
| 6,028,384 | A | * | 2/2000 | Billman et al. ................. 310/83 |
| 6,091,172 | A | * | 7/2000 | Kakinuma et al. ............. 310/71 |
| 6,333,576 | B1 | | 12/2001 | Ishikawa et al. |
| 7,271,512 | B2 | * | 9/2007 | Lee et al. ........................ 310/43 |
| 2007/0040463 | A1 | | 2/2007 | Zorweg et al. |

FOREIGN PATENT DOCUMENTS

| DE | 202005012820 U1 | 1/2007 |
| DE | 102005040290 A1 | 2/2007 |
| FR | 2505572 A1 | 11/1982 |

OTHER PUBLICATIONS

German Search Report issued Oct. 11, 2012 in Priority Appln No. DE102011054958.7, 4 pgs—not translated.

* cited by examiner

*Primary Examiner* — Dang Le
(74) *Attorney, Agent, or Firm* — Grossman, Tucker, Perreault & Pfleger, PLLC (57) ABSTRACT

A housing for an actuator for receiving an electric motor and further functional units of the actuator, wherein a can is integrally molded to an inner face of the housing that is designed to receive the electric motor and wherein means of fastening are integrally molded to the can that are designed to position and fix the electric motor accommodated in the can.

17 Claims, 5 Drawing Sheets

HOUSING FOR AN ACTUATOR FOR RECEIVING AN ELECTRIC MOTOR AND AN ASSEMBLY

FIELD OF THE INVENTION

The invention relates to a housing for an actuator for receiving an electric motor as well as an assembly having a housing and an electric motor.

BACKGROUND

One field of application of the invention is in actuators having small motors that require a compact construction and light weight, particularly small-scale brushless DC motors which are used in the automotive industry, such as a small motor actuator, a fan and cooler motor, a drive for flap actuators used, for example, in air conditioning units and for cooling the motor etc., the invention not being limited to these applications. Other electric motors could also be used.

Common electric motors generally have a motor housing by means of which they are connected to the housing of the actuator. Electric motors for flap actuators that do not have their own motor housing are also known, their shape being made to conform to a recess in the housing of the actuator in such a manner that allows them to be fixedly supported in the recess. For example, small motors having a partially out-of-round stator are thus supported in a positive fit in an appropriate recess in a wall of the housing.

For known actuators there is the problem that an additional motor housing or specially formed components of the electric motor have to be provided so as to fixedly position the electric motor in the housing of the actuator, further means having to be provided for the purpose of fixing the electric motor to the housing. This accordingly results in an increase in the amount of material needed and requires a more complex assembly of the electric motor in the housing of the actuator.

It is thus an object of the invention to provide a means of support and attachment for an electric motor in a housing of an actuator that avoids the disadvantages described above and at the same time allows the simplest possible and most compact construction for the housing.

SUMMARY

The invention provides a housing for an actuator for receiving an electric motor and further functional units of the actuator, where a can that is designed to receive the electric motor is integrally molded to an inner face of the housing. Means of fastening are in turn integrally molded to the can which are designed to position and fix the electric motor accommodated in the can.

In the housing according to the invention, the electric motor can be easily disposed, positioned and fixed. Here, there is no need for either an extra motor housing or for further components of the electric motor. Moreover, it is not necessary for the electric motor to be given a shape that conforms to the housing whose only function is to allow its non-rotatable support in the housing through a positive fit with the housing. Instead, according to the invention, a can for receiving the electric motor is integrally molded to an inner face of the housing, the can being equipped through the use of integrally molded fastening means to position and fix the electric motor.

The can makes it possible to precisely position and center the electric motor and safeguards the motor against radial displacement. Moreover, the distance of the means of fastening with respect to one another and to the can may be used to ensure that the centered electric motor can only be inserted into the can with a desired orientation. Since no further production steps for adjusting the electric motor need be carried out, assembly is made more simple and speedier. In addition, the means of fastening may engage in the electric motor so as to fix the electric motor. The electric motor is accordingly effectively safeguarded by the can and the means of fastening not only from turning but also from any radial and axial displacement in the housing.

In one embodiment, the means of fastening takes the form of pins integrally molded to the can that interact with corresponding fastening elements, such as mounting ears, on the electric motor. It is also possible to provide mounting ears on the can and corresponding pins on the electric motor or any other kind of interacting fastening elements, such as locking or snap connectors. In one embodiment, mounting ears are integrally molded to the outside circumference of the electric motor, into which pins on the outside circumference of the can engage. Moreover, fastening bars may be integrally molded to the outside circumference of the can that form supporting surfaces from which at least one pin projects in an axial direction and on which the corresponding fastening element of the electric motor rests, so that the pin engages, for example, in a mounting ear. One pin can be provided for each fastening bar, the pin engaging in a mounting ear of a fastening element. Two or more pins per fastening bar may also be provided, each of which can engage in separate fastening elements or in the same fastening element. The pins (means of fastening) engaging in the mounting ears (fastening elements) safeguard the electric motor against turning as well as against any radial displacement. To effectively prevent an axial displacement, the pins may be connected to the mounting ears using a positive fit or a force fit.

The can may be dimensioned such that it tightly encloses the outside circumference of the electric motor and forms a motor housing. In this way, the electric motor can be particularly effectively safeguarded against radial displacement. In addition, noise and vibrations caused by the electric motor can be dampened through the shape given to the can.

The housing may be designed to receive a gear unit having at least two gear stages and to position and support the gear stages with respect to one another and with respect to the electric motor. For this purpose, either bearing supports may be provided in the housing that can receive a shaft of a gear wheel of one of the gear stages, or bearing supports for axles which can receive a shaft of a gear wheel may be provided. Here, the bearing supports may be injection molded to an inner wall of the housing and take the form of hollow cylinders or cylindrical projections in which the corresponding axles of the gear stages can be inserted. This kind of bearing support may also be formed in or on the side wall of the can so as to make positioning of the electric motor even more simple.

According to a further embodiment of the invention, pins or other means of fastening are integrally molded to the housing, such as snap-in hooks, bars etc., for positioning and fixing further functional units, such as circuit boards. The pins may be formed on bars in the housing that act as a supporting surface for the respective functional unit, where the pins can engage in corresponding fastening elements of the functional units, for example, in corresponding openings in the circuit board. This goes to produce a particularly stable support for the functional units. Through a circuit board or other functional unit disposed above the electric motor, the electric motor may additionally be safeguarded against displacement in an axial direction. The means of fastening engaging in the fastening elements of the functional units, such as pins led through the openings in the circuit board, may be hot caulked. As an alternative, the pins may take the form, for example, of snap-in connectors or press-fit pins that interact with the functional units.

In one embodiment, the housing is designed as a single piece injection-molded part. Here in particular, the can and the pins may be injection molded to the housing. This one-piece construction makes the manufacture of the housing more simple since no further production steps are needed to affix additional components for positioning and fixing the electric motor.

The housing according to the invention may be used in an assembly having an electric motor whose stator has slot insulation, where the slot insulation has fastening elements that interact with the means of fastening integrally molded to the can. The stator of the electric motor can thus be inserted into the can such that mounting ears integrally molded to the slot insulation, for example, rest on the rim of the can and project laterally beyond the rim of the can, so that they interact with pins integrally molded to the can.

Since the fastening elements are directly formed on the slot insulation, the manufacture of the stator is made considerably more simple. In particular, no further production steps whatsoever are needed to affix additional means of fastening to the stator or the electric motor. It is advantageous if the slot insulation is manufactured as a two-piece injection-molded plastic part and slid onto each side of the stator of the electric motor in an axial direction.

In one embodiment of the invention, a flange is formed on an end face of the slot insulation to which the fastening elements are integrally molded, the fastening elements protruding radially from the flange. The flange may form a supporting surface that is adapted to conform to the rim of the can in the housing. The flange can then lie flush on the rim of the can and the fastening elements integrally molded to the flange can jut out from the rim of the can, which goes to facilitate the support and positioning of the stator for its attachment in the housing.

In a further embodiment of the invention, at least one projection for aligning the electric motor is formed on the inner face of the can. Thus a projection extending in an axial direction may be formed on the inner face, the projection interacting with a corresponding groove on the electric motor such that the electric motor is safeguarded against turning. For example, longitudinal axial grooves may be formed on the outer face of the stator back yoke, one of the longitudinal grooves being slid over the projection in the can as the electric motor is inserted.

In an embodiment, the bottom of the can and the opposing bottom end face of the slot insulation interact with each other so as to position the stator of the electric motor. Thus the slot insulation on the bottom end face may have, for example, a depression, so that the stator can be fixedly supported on the correspondingly shaped can bottom. The stator can be additionally safeguarded against turning by the depressions, and with the appropriate design and number of depressions also against radial displacement. Thus, in the bottom of the can at least one radially aligned strut may be formed that engages in a corresponding depression. The design of the inner face of the can and the bottom of the can may thus allow the stator of the electric motor to be more effectively safeguarded against turning within the can.

In a further embodiment of the invention, one or more bearing supports are formed on an inner wall of the housing that are used to support a hollow shaft of the rotor of the electric motor and/or axles of one or more gear stages.

In an embodiment, at least one bearing support, which is used to support an axle of a gear wheel, is formed in the side wall of the can. A corresponding recess may be provided in the slot insulation that at least partly engages around the bearing support in the side wall when the electric motor is set in the can. This makes it possible for the stator to be even more effectively safeguarded against turning, and positioning the stator in the can is made more simple.

In an embodiment, projections are formed on the end face of the slot insulation facing away from the can bottom, the projections projecting in an axial direction and forming a wire guide. The projections may be formed near an inside circumference of the slot insulation and have at their exposed ends an angled rim, so as to produce an L-shaped cross-section. The rim ensures that the wires led through the wire guide cannot be displaced in an axial direction over the ends of the projections. The wire guide thus allows the wires to be accurately led to individual coils of the electric motor. Since the projections can be integrally formed with the other components of the slot insulation as one piece, this results in increased material savings and an optimization of the manufacturing process.

In a further embodiment, a connector pin is embedded in at least one of the axial projections. The connector pin may extend in an axial direction from the end face. The connector pins may be pressed into the respective projection and establish electrical contact to one of the respective coils via a wire fed into the wire guide, thus allowing the individual coils to be controlled simply and effectively without the need for any other structural elements to be provided on the stator.

According to one embodiment, a circuit board is disposed on the end face of the electric motor facing away from the bottom of the can and connected to the housing such that the electric motor is safeguarded against displacement in an axial direction. Here, the circuit board may cover the electric motor, the shaft of the rotor of the electric motor being led through a corresponding opening in the circuit board. The circuit board is in contact with connector pins of the stator, so that the coils of the electric motor are electrically connected to the circuit board via the connector pins. In addition, the circuit board can be supported and fixed to the housing by pins, using, for example, a positive-fit or force-fit attachment. Thus through the circuit board, the coils of the electric motor may be controlled via the connector pins, and at the same time, in addition to its attachment using the fastening elements, the electric motor can also be safeguarded against axial displacement using the circuit board.

As mentioned above, in one embodiment of the present invention the motor housing is formed only by the can.

In one possible application, the assembly according to the invention is an actuating drive for a flap actuator in a motor vehicle and has a brushless DC motor whose outside circumference is less than or equal to 60 mm, or less than or equal to 30 mm. The stator of the electric motor may have a diameter between 12 and 50 mm, such as about 24 mm. The rotor of the electric motor may accordingly have a diameter between 8 and 30 mm, such as about 12 mm.

DESCRIPTION OF DRAWINGS

The invention is described in more detail below on the basis of embodiments with reference to the drawings. The drawings show.

DESCRIPTION OF EMBODIMENTS

Figure 1:
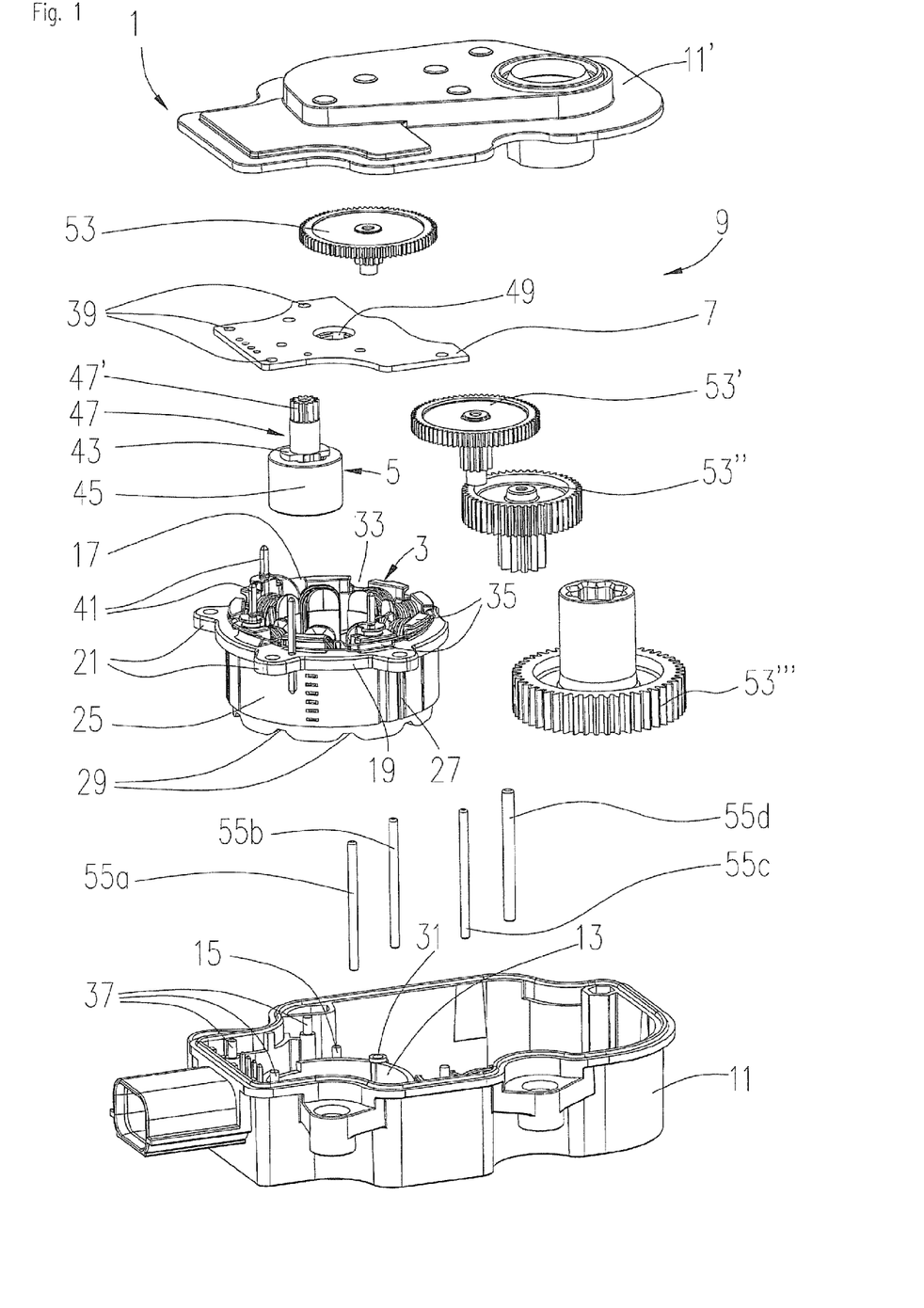
FIG. 1 an exploded view of an assembly according to an embodiment of the present invention, FIGS. 2a and 2b a view from below and a perspective view of a housing having a stator in place according to an embodiment of the invention, FIGS. 3a to 3c a longitudinal section through a rotor as well as a perspective view and an end view of the rotor as can be used in an assembly according to an embodiment of the invention, FIG. 4 an exploded view of a gear unit of the assembly according to an embodiment of the invention and FIG. 5 a view from below of the assembly of FIG. 4.

FIG. 1 shows an assembly according to an embodiment of the present invention in an exploded view. The assembly 1 has an electric motor, particularly a brushless DC motor having a stator 3 and a rotor 5, a circuit board 7 for controlling the DC motor and a gear unit 9 that is driven by the DC motor. The DC motor, the circuit board 7 and the gear unit 9 are disposed in a housing 11 that can be closed by a cover 11'. The cover 11' may additionally have a seal so as to protect the interior of the assembly 1 from soiling and any other outside influences.

The DC motor is accommodated in the housing 11 in a can 13 that is integrally molded to an inner face of the housing 11. The can 13 has an inside diameter that largely corresponds to the outside diameter of the stator 3, so that the can 13 tightly encloses the stator 3. According to the invention, pins 15 are integrally molded to the can 13 for the purpose of positioning and fixing the DC motor. The stator 3 is provided with slot insulation 17 that has a flange 19 on an end face to which mounting ears 21 are integrally molded that project in a radial direction from the outside circumference of the slot insulation 17. The pins 15 are led through the mounting ears 21 so as to position the stator 3 in the can 13 with respect to the housing 11 and to fix it to the housing 11. For this purpose, the pins 15 are formed on the rim of the can 13 such that the rim of the can forms a supporting surface for the flange 19 and the mounting ears 21 of the slot insulation 17, and the pins 15 are led through the mounting ears 21. This goes to safeguard the stator 3 against any radial displacement and turning. The pins 15 led through the mounting ears 21 may, for example, be hot caulked so that the stator 3 can also be safeguarded against any axial displacement.

Thus, to attach the DC motor to the housing 11, it is not necessary to have an extra motor housing nor do parts of the DC motor need to be given a special form so as to allow the stator 3 to be supported in the housing 11 in a positive fit. According to the invention, the stator 3 is rather directly positioned with respect to the housing 11 and fixed to the housing 11 using the can 13 and the integrally molded pins 15. This makes mounting the DC motor in the housing 11 considerably more simple.

The support for the stator 3 may be further optimized in that a longitudinal groove 27 is provided in a back yoke ring 25 of the stator 3 into which a corresponding projection (not illustrated) in the inner wall of the can 13 can be guided. What is more, evenly spaced depressions 29 are formed on a bottom end face of the slot insulation 17 opposing the bottom of the can in the region of the stator slots, into which appropriately formed projections (not illustrated) in the bottom of the can 13 may engage. The depressions 29 as well as the longitudinal groove 27 safeguard the stator 3 against turning in the can 13 in addition to the mounting ears 21 of the slot insulation 17.

In order to simplify mounting and adjusting the stator 3 and thus the DC motor in the can 13, a bearing support 31 for a shaft or an axle of the gear unit 9 is furthermore formed on the side wall of the can 13. The flange 19 of the slot insulation 17 accordingly has a recess 33 which at least partially encloses the bearing support 31 when the stator 3 is set in the can 13. This goes to ensure that the stator 3 inserted in the can 13 always assumes a predetermined orientation. Moreover, through the slot insulation 17, the bearing support 31 additionally safeguards the stator 3 against turning.

The DC motor is additionally attached with the aid of the circuit board 7 that rests on the end face of the slot insulation 17 and thus secures the stator 3 in an axial direction. The circuit board 7 is attached to the housing 11 using bars 37 that form a supporting surface for the circuit board 7, pins of the bars 37 engaging in corresponding openings 39 in the circuit board. The ends of the pins may be hot caulked so as to permanently fix the circuit board 7. However, the invention is not limited in this respect. So that instead of hot-caulked pins, other positive-fit and/or force-fit connections, such as snap-in connectors and press-fit pins may be used. On its end face facing the circuit board 7, the slot insulation 17 has a series of L-shaped projections 35 that act as wire guides for the coil wires.

The electrical contact between the circuit board 7 and the stator 3 is effected using connector pins 41 that are pressed into the projections 35 of the slot insulation 17 and extend in an axial direction from the end face of the slot insulation 17. The connector pins 41 are led through corresponding openings in the circuit board 7 and soldered on there. The connector pins 41 are in turn connected to the respective coils of the stator 3 so as to establish electrical contact between the circuit board 7 and the coils of the stator 3.

Alongside a processing unit, the circuit board 7 may include a plurality of sensors that determine the rotational position of the rotor 5. For example, at least one Hall sensor may be disposed on the circuit board 7 to directly measure the axial leakage field of the rotor 5. The circuit board 7 may furthermore have an interface for communication and/or power supply, such as a connection to any data bus or a specialized field bus like the LIN bus.

The rotor 5 comprises a magnet carrier 43 on which an annular permanent magnet 45 is disposed. The magnet carrier 43 is integrally formed with a shaft 47 which is led through an opening 49 in the circuit board 7. The shaft 47 has a gear wheel 47' that drives the downstream gear unit 9. Both the shaft 47 as well as the gear wheels 53, 53', 53" are supported on axles 55a or 55b, 55c and 55d, where the axle 55a is disposed in the can 13 and the axle 55b is disposed in the bearing support 31 in the side wall of the can 13. Moreover, the shaft of the gear wheel 53''' is directly supported in a bearing support in the housing 11.

Thanks to the integral construction of the housing 11 as one piece, the illustrated embodiment of the assembly 1 according to the invention facilitates material-saving in the manufacturing process and thanks to the can 13 and the integrally molded pins 15, it enables rapid mounting of the DC motor in the housing 11.

The illustrated assembly 1 can be used as an actuator where the rotational speed of the rotor 5 may, for example, be up to 4,000 rpm, for example, in the range of 500 to 2,500 rpm in order to generate a rotational speed at the drive side of, for example, 3 to 10 rpm and a torque of, for example, 1 to 2 Nm. One field of application of the invention is in the automotive industry for controlling flap actuators, for example, in air conditioning units or for the motor control, the present invention not being restricted to these applications.

Figure 2A:
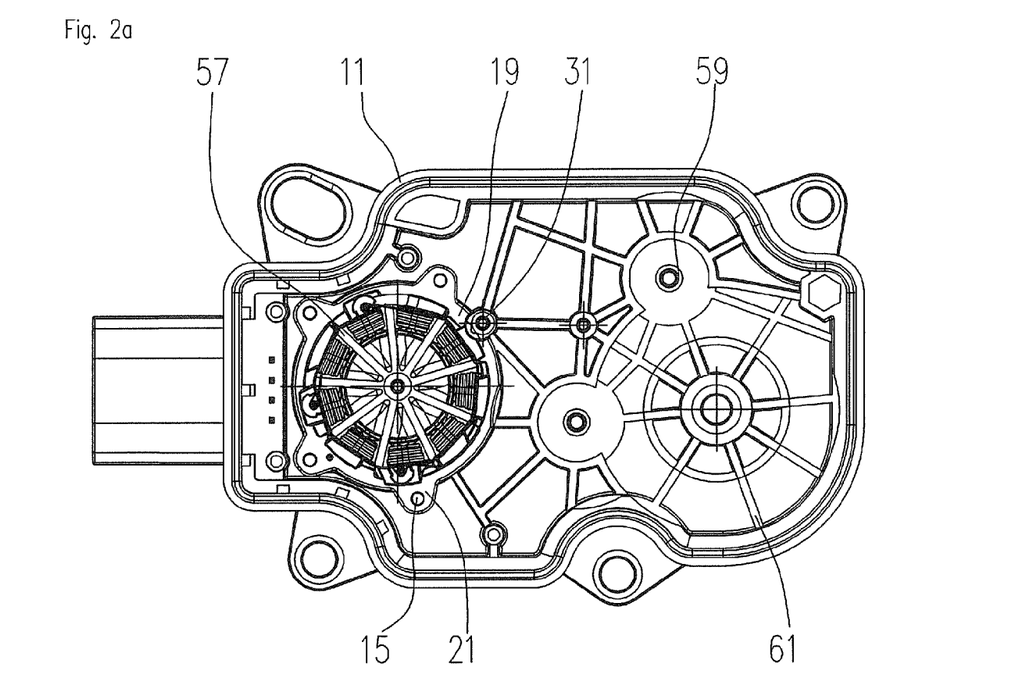
Figure 2B:
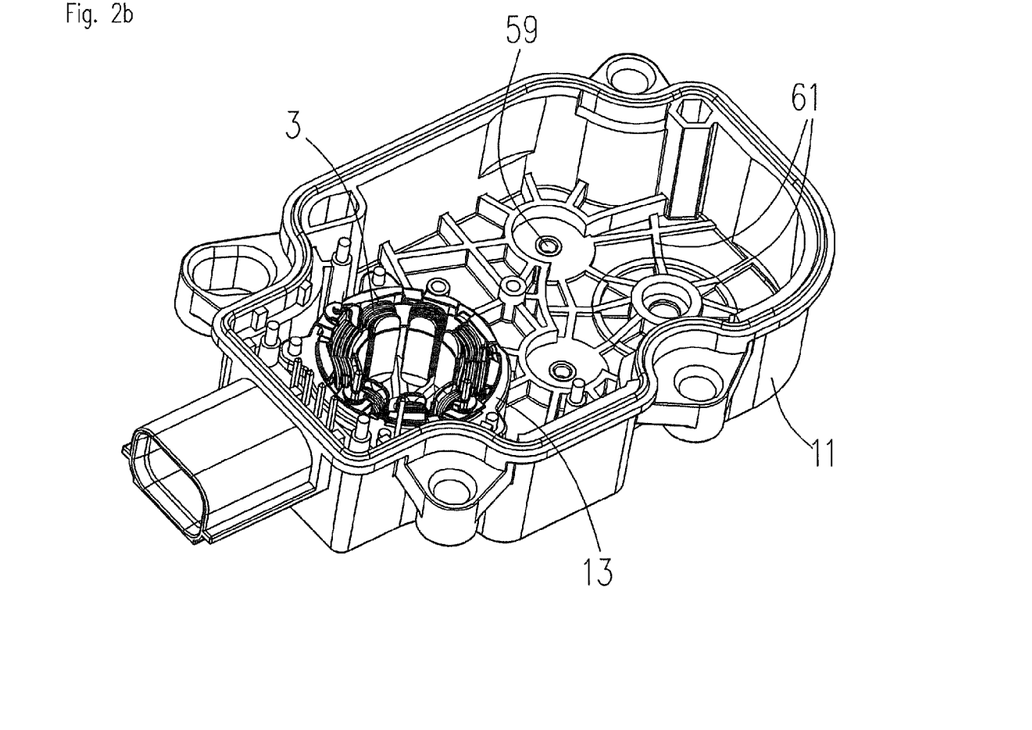

The housing 11 and the stator 3 of the assembly 1 according to the embodiment of the invention illustrated in FIG. 1 are further illustrated in a view from below and in a perspective view in FIGS. 2a or 2b respectively. As can be seen in FIGS.

2a and 2b, the stator 3 is set in the can 13 of the housing 11 with the flange 19 resting on the rim of the can 13 and the pins 15 engaging through the mounting ears 21. In the bottom of the can 13, a number of radially aligned struts 57 are formed that engage in the depressions 29 in the bottom of the slot insulation 17 so as to safeguard the stator 3 against turning in the can 13. Furthermore, alongside the bearing support 31, the bearing support for the axle 55a of the shaft 47 in the bottom of the can 13 is shown. Moreover, in the bottom of the housing 11 further bearing supports 59 for axles 55c, 55d of the downstream gear unit 9 are formed, the bottom of the housing 11 being reinforced by struts 61 extending radially to the respective axle 55c, 55d.

Figure 3A:
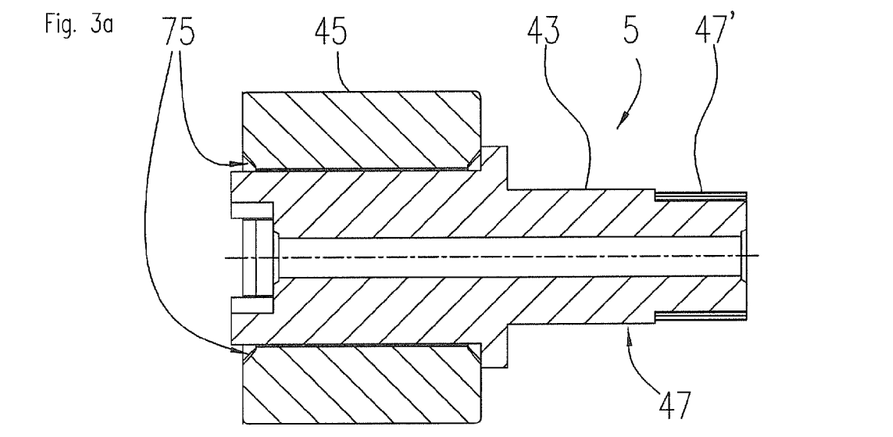
Figure 3B:
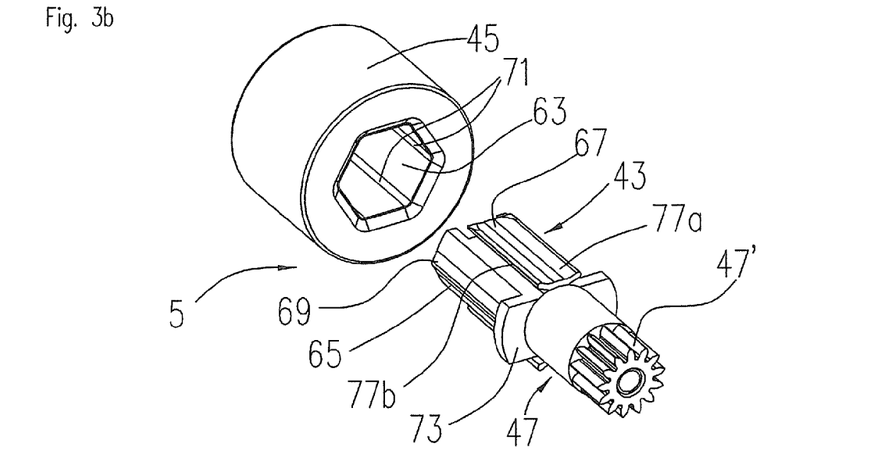

FIGS. 3a and 3b show a section through and an exploded view of a rotor as can be used in an assembly according to an embodiment of the present invention. Corresponding components are accordingly indicated by the same reference numbers as in FIG. 1. The rotor 5 has a magnet carrier 43 taking the form of a hollow shaft and a circular cylindrical permanent magnet 45 in which a recess 63 is provided through which the magnet carrier 43 can be guided so as to connect the shaft 47 to the permanent magnet 45. Such a two-piece embodiment for the rotor 5 is particularly more cost-effective for medium-sized manufacture with a production rate of less than 1 million pieces a year than, for example, one-piece manufacture.

In the illustrated embodiment of the rotor 5, the recess 63 through the permanent magnet 45 is designed as a hexagonal recess. However, the recess 63 could also take the form of any other polygonal recess or it may have an oval contour or any other non-circular contour. For its connection to the permanent magnet 45, the magnet carrier 43 has at least one first connecting element 65 that establishes a positive fit with the recess 63 in the permanent magnet 45, as well as at least one second connecting element 67 that establishes a force fit between the magnet carrier 43 and the permanent magnet 45.

The positive fit involving the first connecting element 65 is established in particular using line contact that is produced through a projecting rib 69 which is formed in the first connecting element 65 parallel to the axis of the shaft and which engages in an edge 71 of the recess 63. The projecting rib 69 may be high enough to allow a gap to be formed between the adjacent surfaces of the first connecting element 65 and the surfaces of the recess 63 adjacent to the edge 71, so that the adjacent surfaces do not rest against each other at all or only to a very small extent. In addition, the edge 71 of the recess 63 may itself be chamfered so as to create a space between the surfaces of the first connecting element 65 and the recess 63. This particularly advantageous embodiment of the first connecting element 65 reduces the risk of jamming when the two components of the rotor 5 are assembled, thanks to the small overlap.

The first connecting element 65 is bounded at one end by a projection 73 that extends in a radial direction from the shaft 47 and forms a supporting surface for the permanent magnet 45 mounted onto the magnet carrier 43. The first connecting element 65 is longer than the recess 63, so that the first connecting element 65 fully inserted into the recess 63 projects slightly out of the permanent magnet 45 in an axial direction and may be hot caulked, for example, at the end face of the permanent magnet 45 in order to fix the magnet carrier 43 to the permanent magnet 45. For this purpose, the permanent magnet 45 has a chamfer 75 at the rim of the recess 63 that can receive the material of the first connecting element 65 displaced by the hot-caulking process. As an alternative or in addition, the magnet carrier 43 may have clips or other means of fastening to fix the magnet carrier 43 axially to the permanent magnet 45. Irrespective of the way in which the magnet carrier 43 is axially fixed to the permanent magnet 45, the first and second connecting elements 65, 67 as provided can effectively solve the problem of distortion during assembly of the rotor.

The second connecting element 67 that establishes a force fit with the permanent magnet 45 may be designed as a bending or locking element. As shown in FIG. 3b, the second connecting element 67 comprises two adjacent wings 77a and 77b and a bar extending parallel to the axis of the shaft and projecting radially that connects the wings 77a and 77b in the manner of a Y profile. When the magnet carrier 43 is thus inserted into the permanent magnet 45, the wings 77a and 77b exert pressure at their exposed longitudinal ends on the adjacent surfaces of the recess 63, the pressure being high enough to hold the magnet carrier 43 in the permanent magnet 45 but low enough to allow the magnet carrier 43 to be inserted manually into the permanent magnet 45. Alternatively, the wings 77a and 77b may be dimensioned such that the exposed longitudinal ends engage in the edges 71 of the recess 63 or in corresponding chamfers of the edges 71 and thus exert pressure on the permanent magnet 45.

The second connecting element 67 thus allows a force fit to be established, alongside the positive fit, in a particularly advantageous way, the force fit compensating for the radial play that occurs due to manufacturing tolerances. Particularly with regard to the connections known in the prior art using a press fit and injecting the magnet carrier 43, the illustrated positive-fit and force-fit connection allows simpler mounting and increased resilience in operation.

Figure 3C:
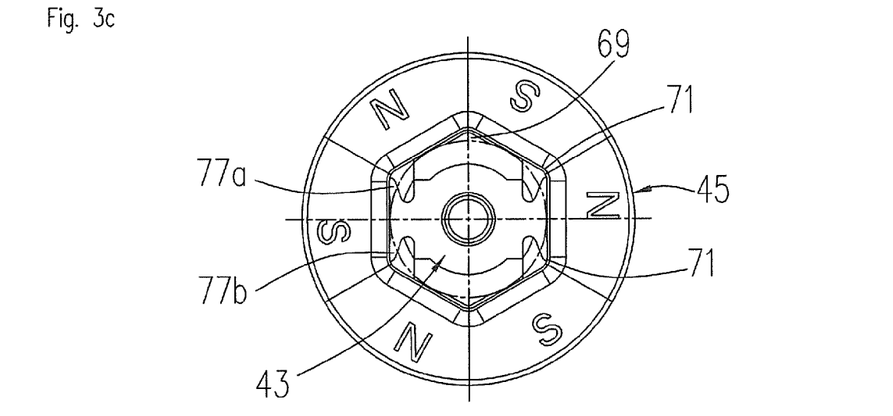

In the illustrated embodiment, the magnet carrier 43 may comprise two opposing first connecting elements 65 and added to this two opposing second connecting elements 67 offset by 90°, so that in the illustrated hexagonal recess 63, the ribs 69 are inserted into the opposing edges 71 of the recess 63 and the bars of the second connecting elements 67 are positioned in the middle and perpendicular to a surface of the recess 63. If the wings 77a, 77b are made wide enough, each edge 71 of the recess 63 is then connected to the magnet carrier 43 in either a positive fit or a force fit, as shown in FIG. 3c.

The permanent magnet 45 may be manufactured as an injection-molded magnet or as a pressed sintered magnet. The polarization of the permanent magnet 45 may be adapted to the recess 63 such that if the recess 63 has a polygonal contour, the pole transitions of the permanent magnet 45 are formed at the edges 71 or narrow areas between the recess 63 and the outer wall of the permanent magnet 45, as shown in FIG. 3c. For example, for a hexagonal recess, a six-pole permanent magnet is then provided. The magnet carrier 43 may be manufactured in one piece in an injection-molding process using a thermoplastic material.

Figure 4:
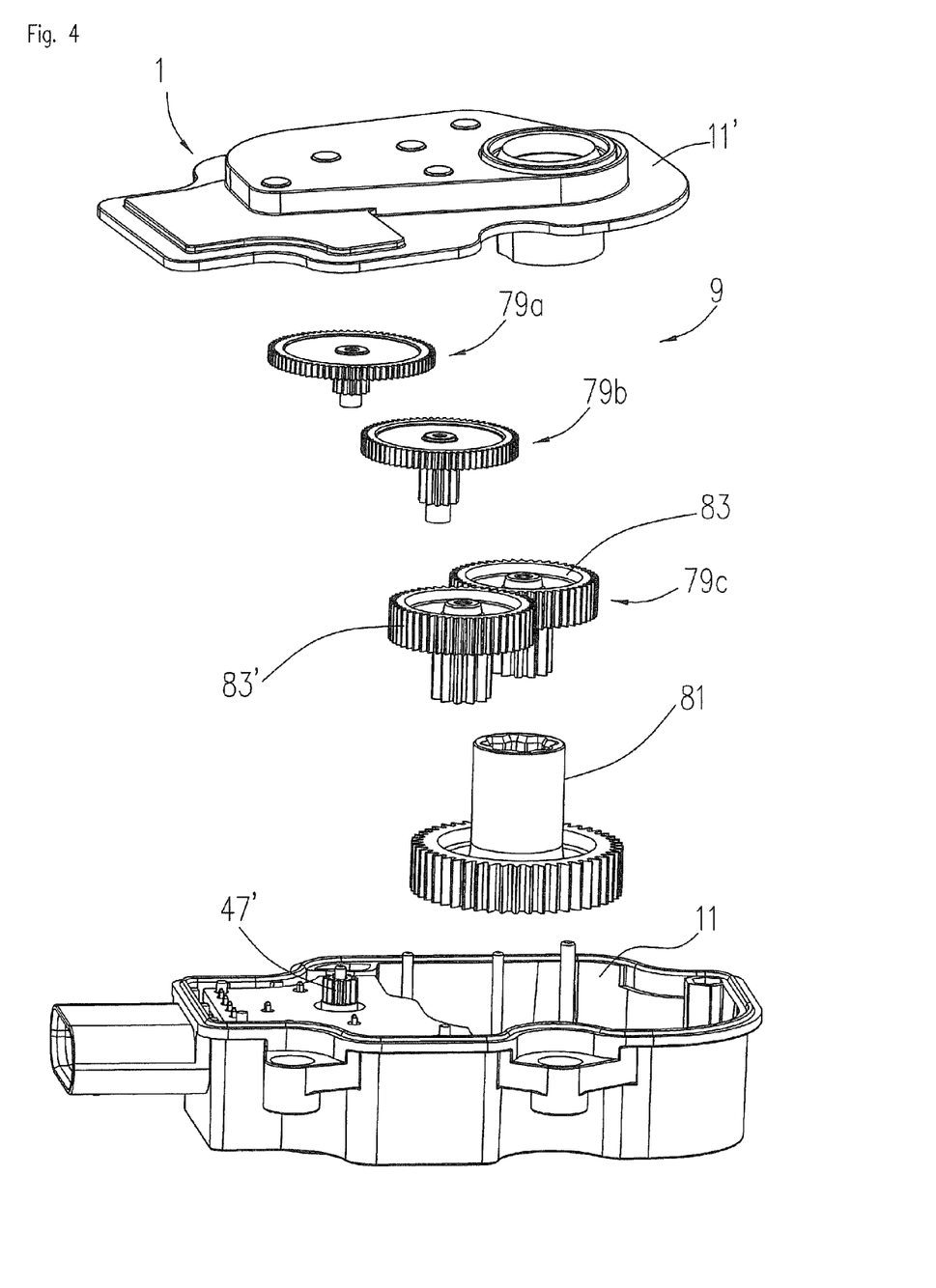
Figure 5:
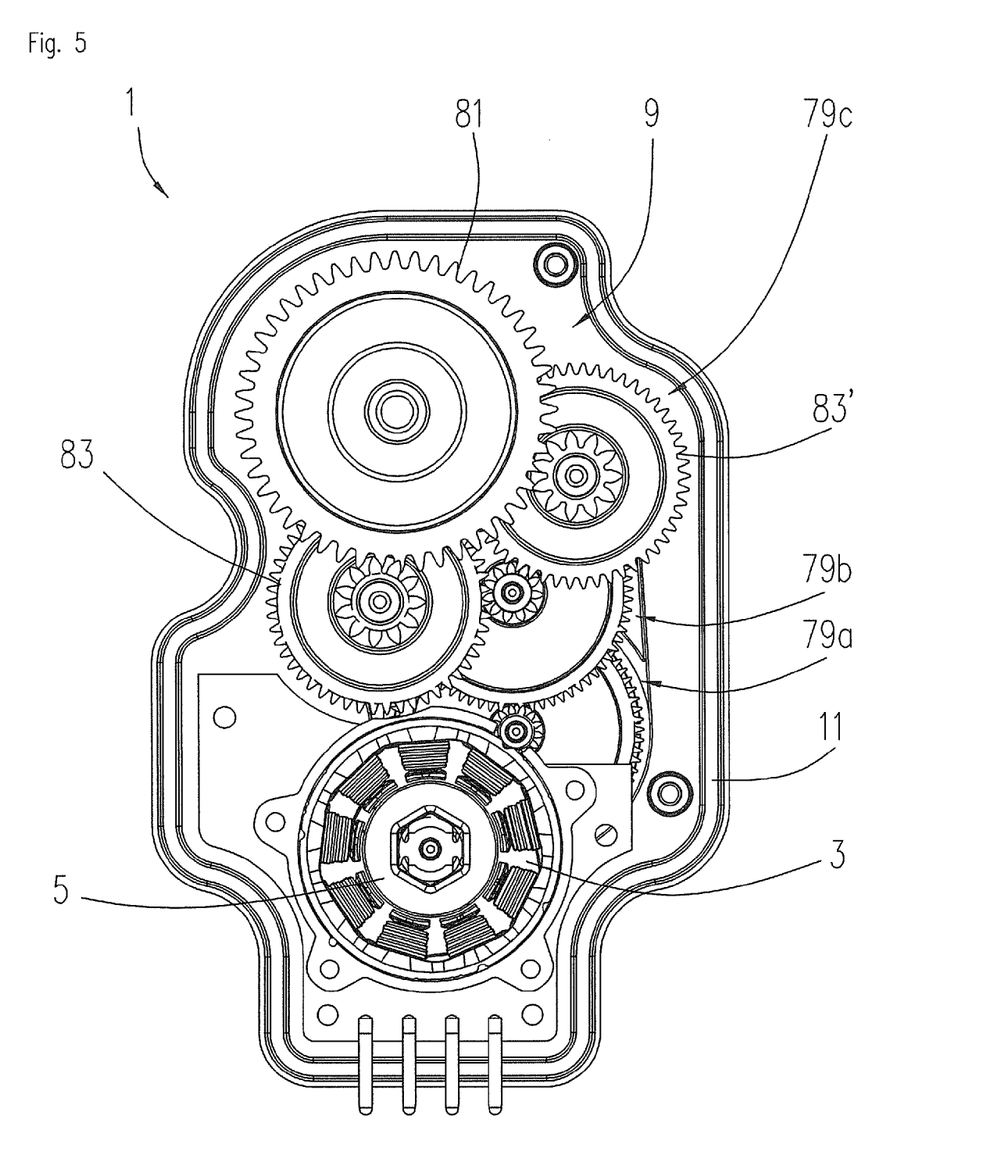

FIGS. 4 and 5 illustrate a gear unit as can be used in an assembly according to an embodiment of the present invention. Here, FIG. 4 shows an exploded view of the gear unit and FIG. 5 a view from below of the assembled gear unit of FIG. 4. Corresponding components in FIGS. 4 and 5 are indicated by the same reference numbers as in FIG. 1. The gear unit 9 of the assembly 1 comprises a plurality of double gear wheels that are indicated in FIGS. 4 and 5 by 79a, 79b and 79c. Each of the double gear wheels takes part in two gear stages, where a first gear stage is formed between the gear wheel 47' on the shaft of the electric motor and the first double gear wheel 79a, a second gear stage is formed between the first and the second double gear wheel 79a, 79b, a third gear stage is formed between the second double gear wheel and the third double gear wheel 79b and 79c and a fourth gear stage is formed between the third double gear wheel 79*c* and the drive wheel 81. In the illustrated embodiment, the third double gear wheel 79*c* comprises two identical double gear wheels 83, 83' connected in parallel which mesh with the second double gear wheel 79*b* to form the third gear stage, and with the drive wheel 81 to form the fourth gear stage. The torque transmitted by the second double gear wheel 79*b* is thus evenly distributed to the two third double gear wheels 83, 83' and from there concentrated again to the drive wheel 81.

As mentioned at the outset, increased torque occurs at the drive wheel 81 for any specific load due to gear reduction in the respective gear stages, which necessitates designing the geometry and the material of the gear wheels at the drive side to be correspondingly more robust so as to withstand the greater load. In practice, for example, in the last gear stage, i.e. from the third double gear wheel 79*c* to the drive wheel 81, a torque can be transmitted which is ten times greater than the torque transmitted by the first stage. If we assume that due to cost considerations and in order to limit space requirements, each gear wheel is only designed to be as large and as stable as is required by the expected load in its gear stage, then for gear chains having only one gear wheel per stage, the gear wheels have to be designed with materials of varying resilience and/or with varying geometries; in particular, the gear wheel in the last stage has to be made of a particularly resilient material and/or with a reinforced gear geometry and a thicker shaft, so as to be able to transmit maximum torque in all possible applications. This results in increased manufacturing costs for the assembly 1. If the assembly 1 is to be of use in different applications in which different nominal torques are to be transmitted, it always has to be designed to take the largest potential load. In contrast, the assembly 1 according to the invention allows high torque to be transmitted to the drive wheel 81 and at the same time the load on the individual gear wheels 83, 83' of the last stage to be alleviated. When the two double gear wheels 83, 83' are used, they are driven in parallel by the previous double gear wheel 79*b* and they themselves in turn drive the drive wheel 81 in parallel. This goes to halve the torque acting on the two double gear wheels 83, 83' and despite the lower load on the individual double gear wheels 83, 83', increased torque can accordingly be transmitted to the drive wheel 81. This in turn makes it possible to use a comparably less robust and thus more cost-effective material as well as a smaller gear geometry, shaft diameter etc.

The invention also makes it possible for one of the double gear wheels 83, 83', for example the double gear wheel 83', to be subsequently removed from the gear unit 9 when there is no need for increased torque on the drive side 81. The function of the assembly 1 remains the same with the only difference being that with one double gear wheel 83 the maximum torque at the drive side 81 is less. The gear unit 9 is thus particularly versatile in its application.

In an embodiment having a gear ratio of approximately 4 to 5 per gear stage and a rotational speed at the drive side 81 of between 3 and 10 rpm, having, for example, one double gear wheel 83 in the last stage on the drive side 81, a nominal torque of approximately 1.2 Nm is transmitted and with two double gear wheels 83 and 83', a nominal torque of approximately 1.75 Nm is transmitted. This data is simply meant to provide an idea of the scale of magnitude of the gear unit according to the invention.

Plastics having a filler may be used as the materials, such as polyoxymethylene and various types of polyamide. For the filling material, fiber glass, glass beads or mineral fillers are used, the stiffness of the double gear wheels 83, 83' varying according to the plastics or plastic mix used. In addition, polytetrafluorethylene can be used for lubrication.

Although the gear unit 9 in FIG. 4 and FIG. 5 is described on the basis of gear wheels and double gear wheels, the gear unit 9 that can find application in the assembly 1 according to the invention is not limited to gear wheels and double gear wheels. Rather, any kinds of gear units and gear wheels can be used, such as in a planetary gear, spiral gear, worm gear, chain gear or in a gear unit having a synchronous belt drive and in other gear units, gear wheels, frictional wheels, worm wheels and others supported on different shafts.

Due to the constant reduction of the gear stages and the thereby increasing torque, it is advantageous to use two gear wheels 83, 83' connected in parallel before the drive side so as to reduce the load placed on the gear wheels in the last gear stage.

The characteristics revealed in the above description, the claims and the figures can be important for the realization of the invention in its various embodiments both individually and in any combination whatsoever.

IDENTIFICATION REFERENCE LIST

1 Assembly
3 Stator
5 Rotor
7 Circuit board
9 Gear unit
11, 11' Housing and cover
13 Can
15 Pins
17 Slot insulation
19 Flange
21 Mounting ear
25 Back yoke ring
27 Longitudinal groove
29 Depression
31 Bearing support
33 Recess
35 Projection
37 Bar
39 Opening
41 Connector pin
43 Magnet carrier
45 Permanent magnet
47 Shaft
47' Gear wheel
49 Opening
53, 53', 53", 53'" Gear wheel
55*a*, 55*b*, 55*c*, 55*d* Axles
57 Struts
59 Bearing support
61 Struts
63 Recess
65 First connecting element
67 Second connecting element
69 Rib
71 Edge of the recess
73 Projection
75 Chamfer
77*a*, 77*b* Wings
79*a*, 79*b*, 79*c* First, penultimate and last stage
81 Drive side
83, 83' Double gear wheel

What is claimed is:

1. A housing for an actuator for receiving an electric motor and further functional units of the actuator, the housing comprising:

an inside wall defining a can integrally molded to an inner bottom face of the housing, the can being shaped to receive and position the electric motor, and the wall having fastening means integrally molded to the can to position and fix the electric motor accommodated in the can;

a space shaped to receive a gear unit adjacent to the can; and one or more bearing supports formed on an inner wall of the housing that are used to support a hollow shaft of the rotor of the electric motor and axles of one or more gear stages, where the shaft as well as gear wheels of a gear unit are supported on axles, and where the bearing support for the axle of the shaft is disposed in the bottom of the can.

2. A housing according to claim 1, wherein the fastening means interact with corresponding fastening elements on the electric motor.

3. A housing according to claim 1, wherein the fastening means comprise pins for positioning and fixing further functional units, the pins integrally molded to the can.

4. A housing according to claim 1, wherein the can tightly encloses the outside circumference of the electric motor and forms the motor housing.

5. A housing according to claim 1 that is designed to receive the gear unit having at least two gear stages and to position and support the gear stages with respect to one another and with respect to the electric motor.

6. A housing according to claim 1 that is formed as a one-piece injection-molded part.

7. An assembly having a housing according to claim 1 and having an electric motor whose stator has slot insulation, wherein the slot insulation has fastening elements that interact with the fastening means integrally molded to the can.

8. An assembly according to claim 7, wherein a flange is formed on one end face of the slot insulation on which the fastening elements are integrally molded, wherein the fastening elements project radially from the flange.

9. An assembly according to claim 7, wherein the fastening elements of the slot insulation comprise mounting ears and the fastening means integrally molded to the can comprise pins, and wherein the pins integrally molded to the can engage in mounting ears, so as to position the electric motor.

10. An assembly according to claim 9, wherein the pins engaging in the mounting ears are hot caulked.

11. An assembly according to claim 9, wherein the bottom of the can and the opposing end face on the bottom of the slot insulation have a complementary feature, so as to guide and position the stator of the electric motor in a configuration to align the fastening means to the mounting ears.

12. An assembly according to claim 7, wherein one or more bearing supports are formed on an inner wall of the housing that are used to support one or more axles of one or more gear stages.

13. An assembly according to claim 12, wherein said at least one bearing support is used to support an axle of a gear wheel of the gear unit.

14. An assembly according to claim 7, wherein projections are integrally molded to the end face of the slot insulation facing away from the bottom of the can, the projections protruding in an axial direction and forming a wire guide.

15. An assembly according to claim 14, wherein a connector pin is embedded in at least one of the axial projections.

16. An assembly according to claim 7, wherein a circuit board is disposed on an end face of the electric motor opposing a bottom face facing the bottom of the housing and connected to the housing such that it safeguards the electric motor against displacement in an axial direction.

17. An assembly according to claim 7 that is an actuating drive for a flap actuator in a motor vehicle and has a brushless DC motor whose outside circumference is less than or equal to 60 mm, or less than or equal to 30 mm.

* * * * *